(12) United States Patent
Fixter et al.

(10) Patent No.: US 8,992,181 B2
(45) Date of Patent: Mar. 31, 2015

(54) WIND TURBINE BLADES

(75) Inventors: Greg Peter Wade Fixter, Hook (GB); Christopher Douglas James Spooner, Bracknell (GB); Christopher James Perry, Yateley (GB)

(73) Assignee: Qinetiq Limited, Farnborough (GB)

( * ) Notice: Subject to any disclaimer, the term of this patent is extended or adjusted under 35 U.S.C. 154(b) by 338 days.

(21) Appl. No.: 13/499,399

(22) PCT Filed: Nov. 1, 2010

(86) PCT No.: PCT/GB2010/002016
§ 371 (c)(1),
(2), (4) Date: Mar. 30, 2012

(87) PCT Pub. No.: WO2011/051687
PCT Pub. Date: May 5, 2011

(65) Prior Publication Data
US 2012/0207612 A1 Aug. 16, 2012

(30) Foreign Application Priority Data
Nov. 2, 2009 (GB) .................................. 0919198.2

(51) Int. Cl.
*F03D 1/06* (2006.01)
*B23P 15/04* (2006.01)
(Continued)

(52) U.S. Cl.
CPC ............... *F03D 1/065* (2013.01); *H01Q 17/00* (2013.01); *F05B 2230/31* (2013.01); *F05B 2260/99* (2013.01); *F05B 2280/6003* (2013.01); *F05C 2253/04* (2013.01); *Y02E 10/721* (2013.01)

USPC .................. 416/223 R; 416/224; 416/229 R; 416/230; 416/232; 416/241 A

(58) Field of Classification Search
USPC .......... 416/223 R, 224, 229 R, 230, 232, 233, 416/241 R, 241 A
See application file for complete search history.

(56) References Cited

U.S. PATENT DOCUMENTS 6,538,596 B1 3/2003 Gilbert
2012/0141291 A1* 6/2012 Appleton .................. 416/241 R

FOREIGN PATENT DOCUMENTS

| EP | 1 796 450 A1 | 6/2007 |
| EP | 2 096 711 A1 | 9/2009 |
| FR | 2 930 601 A1 | 10/2009 |

(Continued)

OTHER PUBLICATIONS

Pinto, J., et al., "Radar Signature Reduction of Wind Turbines through the Application of Stealth Technology," IEEE Antennas and Propagation, 2009, pp. 3886-3890.

(Continued)

*Primary Examiner* — Igor Kershteyn
(74) *Attorney, Agent, or Firm* — Oliff PLC

(57) ABSTRACT

A wind turbine blade includes a multilayer composite structure including a first reflective layer, and a second layer including a plurality of resistive circuit analog (CA) elements. The CA elements are tuned so as to interact with the first layer to provide absorption of electromagnetic (EM) energy over a desired frequency range. The parameters of the CA elements can be varied to provide for frequency tuning and to maintain absorption at a specific frequency range despite varying layer separation, while at the same time ensuring that the mechanical properties of the CA layer are compatible with integration into the turbine blade.

12 Claims, 3 Drawing Sheets

(51) Int. Cl.
*F03D 11/00* (2006.01)
*H01Q 17/00* (2006.01)

(56) References Cited

FOREIGN PATENT DOCUMENTS

| JP | A-1-293699 | 11/1989 |
| WO | WO 2009/140949 A1 | 11/2009 |
| WO | WO 2010/122351 A2 | 10/2010 |
| WO | WO 2011/024009 A1 | 3/2011 |

OTHER PUBLICATIONS

Barras, C. "Stealthy wind turbines aim to disappear from radar screens," New Scientist, 2009, www.newscientist.com/article/dn18032-stealthy-wind-turbines-aim-to-disappear-from-radar-screens.html.
Appleton, S., "Stealth Blades—a progress report," QinetiQ, May 25, 2005. www.all-energy.co.uk/UserFiles/25Appleton.pdf.
Appleton, S., "Design & Manufacture of Radar Absorbing Wind Turbine Blades—Final Report," QinetiQ report for DTI, 2005, pp. 1-50.
Bryanton, M., et al., "Stealth Technology for Wind Turbines Final Report," BAE Systems Report for BERR, Dec. 2007, pp. 1-87.
International Search Report issued in International Patent Application No. PCT/GB2010/002016 dated Aug. 30, 2011.
Written Opinion of the International Searching Authority issued in International Patent Application No. PCT/GB2010/002016 dated Aug. 30, 2011.
Search Report issued in British Patent Application No. GB0919198.2 dated Feb. 23, 2010.

* cited by examiner

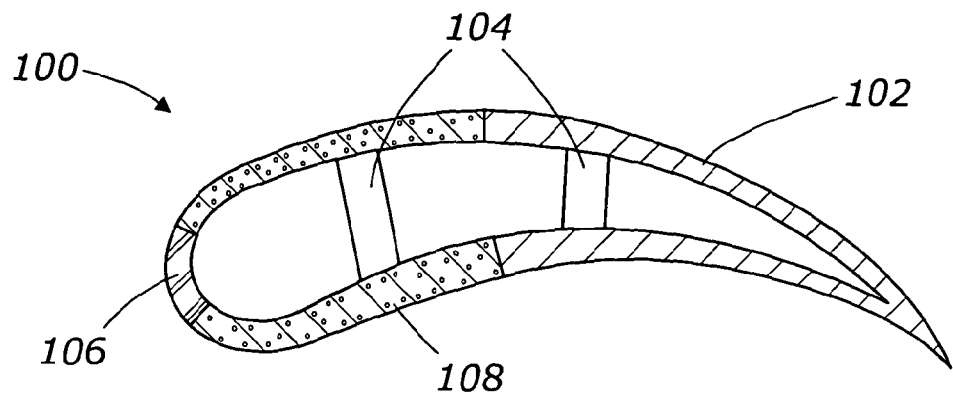
Fig. 1
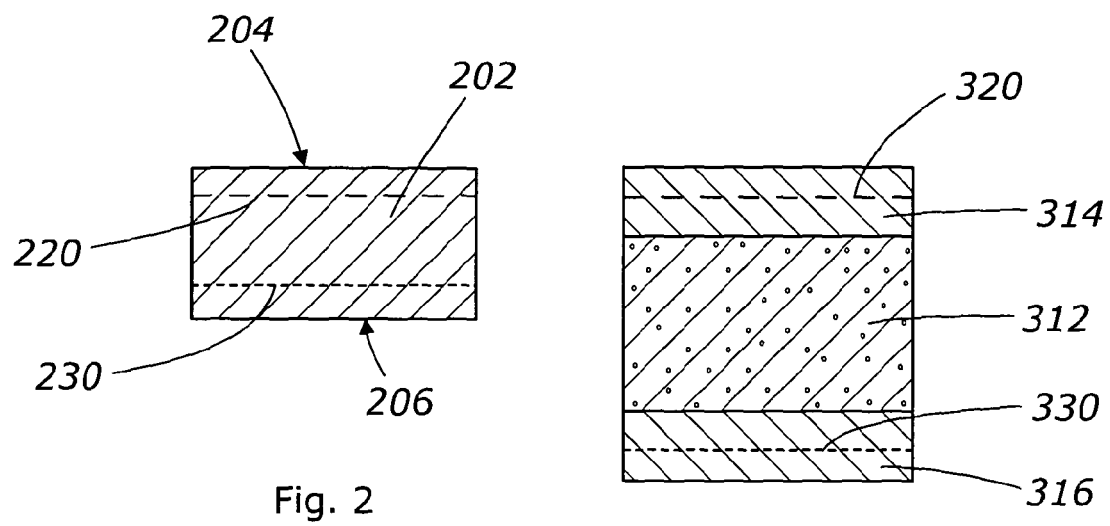
Fig. 2
Fig. 3

WIND TURBINE BLADES

BACKGROUND

This invention relates to wind turbines and wind turbine blades, and to the reduction in reflectivity of such turbine blades to electromagnetic radiation.

Renewable energy targets rely heavily on wind power, both onshore and offshore. However, a significant percentage of all planning applications for new wind farms are rejected on the grounds that they will interfere with civil airport radars. The use of radar absorbing materials (RAMs) for wind turbines has previously been proposed to reduce the effect on ATC (Air Traffic Control) radar and ADR (Air Defence Radar) by reducing the RCS (Radar Cross Section). Wind turbine blades are highly specified to meet stringent performance criteria however, and the introduction of RAM to the blades ideally results in little or no modification of the structural properties and/or weight of the blade. This presents a significant engineering challenge.

The present applicant has produced a report entitled "Design and manufacture of radar absorbing wind turbine blades—final report" as part of a DTI funded study. In this report the glass reinforced epoxy (GRE) and GRE/foam sandwich construction of certain turbine blades is noted, and it is suggested that a Jaumann type absorber could be used by including a resistive layer at a specific spacing from a perfect electrical conductor (PEC). The outermost GRE skin can be modified using a lossy impedance layer, and a reflector included on the inside surface of the sandwich construction. It is stated that impedance layers can be made from glass fibre tissues impregnated with a small amount of chopped carbon fibres. A carbon fibre cloth layer can act as the PEC, inserted into the rear of the GRP skin.

It is an object of the present invention to provide improved wind turbine blades and associated methods.

SUMMARY

According to a first aspect of the present invention then, there is provided a wind turbine blade comprising a multi-layer composite structure including a first reflective layer, and a second layer spaced apart from said first layer by a predetermined separation, said second layer comprising a plurality of resistive circuit analogue (CA) elements; wherein said CA elements are tuned so as to interact with said first layer to provide absorption of electromagnetic (EM) energy over a desired frequency range.

Circuit analogue (CA) layers refer to geometrical patterns which are made up of conducting or resistive material. They are often defined by their effective conductance and susceptance, which together can be used to model the electromagnetic response of the layer. In this specification therefore, the term circuit analogue element is used to refer to a conducting pattern, the precise geometry and material conductivity of which allows the absorption of a CA-structure (comprising the CA element) to be tuned to a designed frequency or frequency range. Such elements have previously been proposed for applications such as anechoic chambers and stealth coatings, and are typically designed to absorb radiation in a wide range of frequencies. In preferred embodiments of the present invention however, since absorption is desired in a known frequency band corresponding to ATC radar, the absorber panel can advantageously be tuned to provide a desired level of attenuation at a particular frequency.

In one embodiment, the reflective layer may simply comprise a conducting layer, such a substantially continuous carbon sheet. In other embodiments it may only be necessary for the layer to be reflective at or around the desired frequency, eg 3 GHz. In this case a frequency selective surface (FSS) could be employed. A periodic metallic pattern would be suitable in certain embodiments, and could be formed by silver, nickel or copper deposition on a cloth substrate for example.

The use of circuit analogue elements provides a controlled impedance layer, and provides the advantage that the patterns produced can be tailored to provide absorption with the same desired frequency response despite variations in the separation between the first and second layers. This is advantageous in maintaining effective absorption in the desired frequency band across large areas of the blade which, for structural reasons, may have varying structures and profiles.

Furthermore the CA elements offer a number of parameters which can be varied (eg shape, external dimension, track width, gap spacing) to provide for frequency tuning. This provides improved design flexibility, and this can be exploited to maintain absorption at a specific frequency range despite varying layer separation, while at the same time ensuring that the mechanical properties of the CA layer are compatible with integration into the turbine blade.

In one embodiment therefore, the turbine blade includes a plurality of surface regions, the spacing between the first and second layer being different in different regions, and wherein said CA elements have different geometries in said different regions. The different geometries may result from variation in dimensions or spacing of the elements, but alternatively or additionally may result from different shapes. In a particularly preferred embodiment the CA elements comprise squares, which may be square loops or solid square patches, or a combination of the two. Other shapes such as circles, slots and crosses may also be employed.

Thus in at least first and second different regions, first and second different separations exist between the layers, and first and second different CA geometries are provided respectively.

In this way, despite the complex variation in structure and materials of a typical turbine blade, desired absorption can be provided across most if not all of the blade surface using only the two layer approach (resistive CA/controlled impedance layer and reflective layer) noted above and described in further detail below.

In addition to accommodating relative variations in layer separation, advantage is also provided in terms of the absolute layer separations which can be achieved. Embodiments of the presently proposed arrangements and methods allow the two layers to be separated by less than a quarter of a wavelength, or even one tenth or one twentieth of a wavelength, of incident EM energy having a frequency at which absorption is desired.

A blade will typically extend in a lengthwise direction from the root where attachment to a hub is made, to the blade tip. A transverse direction extends from the leading edge to the trailing edge. A combination of factors will influence the number and pattern of different regions which make up the blade surface of any given embodiment. The surface of the blade may be divided into different regions in both lengthwise and transverse directions, and a grid or block pattern may result. Embodiments may exhibit five or more, or ten or more different regions along a lengthwise profile, and three or more different regions in a transverse direction. In larger turbine arrangements therefore, each blade may include 20 or more or 40 or more different regions.

It is not necessary for every different region of the blade to have a unique CA pattern or geometry, and it may be that two or more different regions will require, or can acceptably employ the same design of impedance layer. This can help limit the overall number of different patterns or geometries required. Thus while boundaries between adjacent regions typically define a change in CA design, they do not necessitate the introduction of a new design, and the total number of different designs may be less than the total number of defined regions. Certain embodiments employ ten or more different CA designs. It may be possible to maintain the same basic design of CA element (eg square loop) across the whole blade, and achieve the required variation by adjusting track width for example. Alternatively, to achieve the required number and performance of different design, it may be necessary to vary multiple parameters such as separation and external dimension, or even to vary the element shape.

Regions may be contiguous, however there may also be discontinuities between regions, eg if absorption is not desired or not required for a certain region of the blade.

The number and pattern of the different regions may to a certain extent be dictated by the blade construction, eg where a 'step' change from a monolithic to a sandwich construction exists. A certain amount of design freedom may exist however, eg when dealing with gradually varying blade construction parameters. In some embodiments a single region may be defined and employ a single CA design despite some variation in layer separation across the region. This may result in absorption performance which is slightly sub optimal, but still acceptable. CA designs which offer good absorption over an increased bandwidth offer advantage in this respect. It will be understood that while dividing such a region into one or more smaller regions (ie finer regional resolution), each having specifically tailored CA patterns, improved absorption could result but at the expense of increased complexity.

Preferably the CA elements have an external dimension less than 50 mm. The external dimension is typically the maximum external dimension, eg the side length for a square. By maintaining relatively short lengths of conducting pattern, the layer is better able to tolerate bending without damaging the electrical properties of the elements themselves. If significantly longer conducting elements are used, there is an increased risk of damage to the elements when the layer is formed into a curved blade profile.

In preferred embodiments the circuit analogue elements are formed of resistive material, such as a carbon based composition. The CA layer is provided by a cloth (eg woven glass fabric) in one embodiment, with the CA elements deposited onto the cloth by screen printing with resistive ink. The resistive ink is preferably a carbon based ink having graphite particles suspended in a binder and solvent. Such inks have often been considered as difficult to work with, and significant efforts have been made to facilitate ink jet printing of conductive and resistive inks, or to find suitable alternative deposition techniques (eg electroless plating). It has been found however, that screen printing is particularly suitable for formation of a CA layer suitable for use in embodiments of the present invention. Screen printing is able to deposit the ink to sufficient thickness (eg 10-15 μm on polymer substrate) to achieve the required electrical properties. In addition the thickness and bulk resistivity can be accurately controlled and achieved reliably and consistently across a large area by selection of appropriate parameters such as screen mesh type, squeegee pressure, cure conditions etc. It has been found desirable for CA elements to be provided having a surface resistance of less than 80 Ω/sq. more preferably between 10 and 40 Ω/sq.

It has been found by the present inventors that the percentage coverage of the cloth by the CA elements should be controlled in order to ensure structural integrity within the composite blade structure. Preferred embodiments therefore exhibit the property that the CA elements occupy less than 70% of the surface area of said cloth. Again because of the use of CA elements and the flexibility of design associated therewith, this can be achieved even when multiple other constraints such as layer spacing, and absorption frequency are imposed.

Preferably the absorption provides attenuation of greater than or equal to 20 dB at the centre frequency (of the desired frequency range). Since the absorber is tuned to this centre frequency, attenuation drops off at away from this frequency, however to allow for manufacturing tolerances and other practical considerations, and attenuation of greater than or equal to 20 dB is typically provided in a bandwidth of approximately 300 MHz centred about the nominal. Typically beyond 100 MHz either side of the centre frequency attenuation falls below 20 dB, and may be 10 dB or less.

A further aspect of the invention provides a method of manufacturing a wind turbine blade comprising screen printing a cloth substrate with a plurality of resistive circuit analogue (CA) elements; providing an electromagnetically reflective cloth or fibre layer; and including said printed cloth and said reflective layer in the assembly of the composite layered structure of a wind turbine blade, such that said cloth and said resistive layer are spaced apart by a defined separation.

The basic assembly technique of the composite layered structure can be by any conventional means such as pre-preg lay up or resin infusion. The printed cloth and reflective layer (which may be resin pre-impregnated) are inserted at the desired points in the ply sequence such that, in the finished blade, they have the desired separation.

Preferably the screen printing is rotary screen printing, and preferably the CA elements are formed of a resistive carbon based ink. In embodiments where different geometries of CA elements are used for different blade facets, separate sheets of cloth can be printed with different patterns, and included in the assembly process at corresponding different locations. Cloths having different printed patterns or geometries may be placed directly adjacent one another if desired. Alternatively a single cloth substrate can be the subject of graded printing, with the applied pattern or geometry varying across the cloth.

The invention extends to methods, apparatus and/or use substantially as herein described with reference to the accompanying drawings.

Any feature in one aspect of the invention may be applied to other aspects of the invention, in any appropriate combination. In particular, method aspects may be applied to apparatus aspects, and vice versa.

Furthermore, features implemented in hardware may generally be implemented in software, and vice versa. Any reference to software and hardware features herein should be construed accordingly.

BRIEF DESCRIPTION OF THE DRAWINGS

Preferred features of the present invention will now be described, purely by way of example, with reference to the accompanying drawings, in which:

FIG. 1 shows a cross section through a wind turbine blade.
FIGS. 2 and 3 show alternative blade shell constructions.

DETAILED DESCRIPTION OF THE EMBODIMENTS

Figure 4:
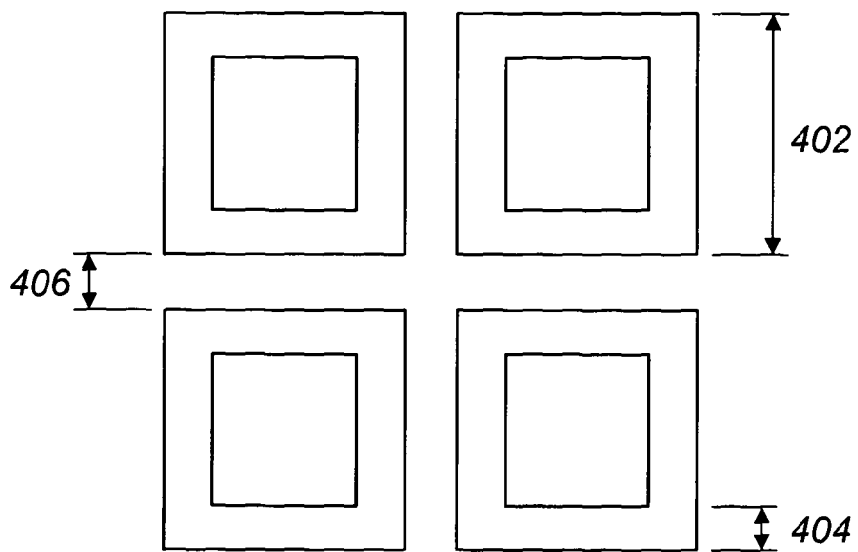
FIGS. 4 and 5 illustrate examples of circuit analogue patterns.

Wind turbine blade 100, shown in cross section in FIG. 1 is generally hollow in construction, formed by an outer shell 102 and including one or more elements or webs 104 to provide additional structural integrity. The outer skin is made up of multiple different sections, having different constructions. For example section 106 is formed of monolithic glass reinforced epoxy (GRE) while region 108 is formed of a GRE foam sandwich construction.

These two types of structure are illustrated in greater detail in FIGS. 2 and 3. In FIG. 2 a monolithic section 202 of GRE is shown, having a typical construction made up of multiple plies or layers of glass fibre held in a polymer matrix, as is well known. Near the outer surface 204 is included a controlled impedance layer 220, while deeper in the structure, closer to the inner surface 206 is a reflective layer 230. These two layers are embedded in the composite structure. Both layers 220 and 230 are flexible cloth based layers in preferred embodiments, and so can be included in the composite manufacturing process with minimum disruption or alteration to the existing manufacturing technique. The positioning of the layers, and hence their separation is determined by the sequence at which they are included during manufacture.

FIG. 3 illustrates a composite foam sandwich construction in which a foam core 312 is sandwiched between upper and lower GRE skins 314, 316. Again a controlled impedance layer 320 and a reflective layer 330 are included, being embedded in the upper and lower (or inner and outer) GRE skins respectively, in an equivalent manner as described above. Here the separation between layers 320 and 330 is determined by the thickness of the foam core in addition to the position of the layers within the GRP portions.

Figure 5:
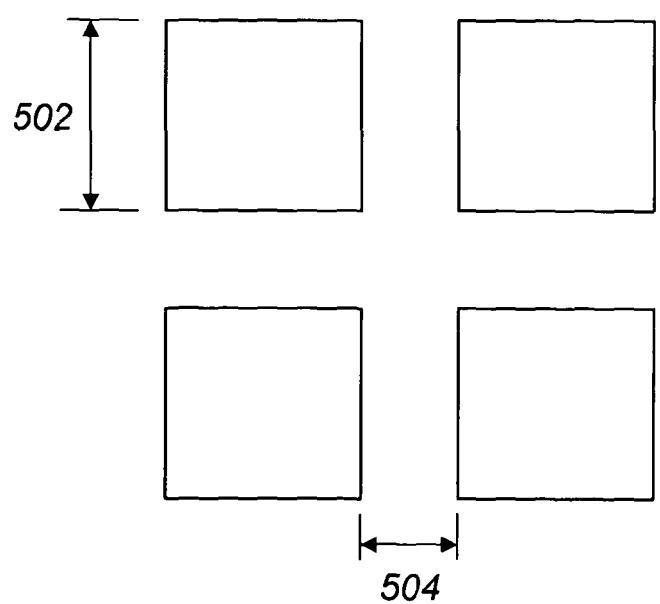

FIG. 4 shows a first example of a circuit analogue pattern which can be used to provide a controlled impedance layer. Here each CA element is in the form of a square loop, the geometric parameters being the external side dimension 402, the track width 404 and the gap 406 between each element. Only four elements are shown but it will be understood that the pattern extends across the whole region of interest. FIG. 5 shows a second example of CA pattern, in which each element is a solid square patch. In this case the geometric parameters are simply the patch side dimension 502 and gap between elements 504.

Figure 6:
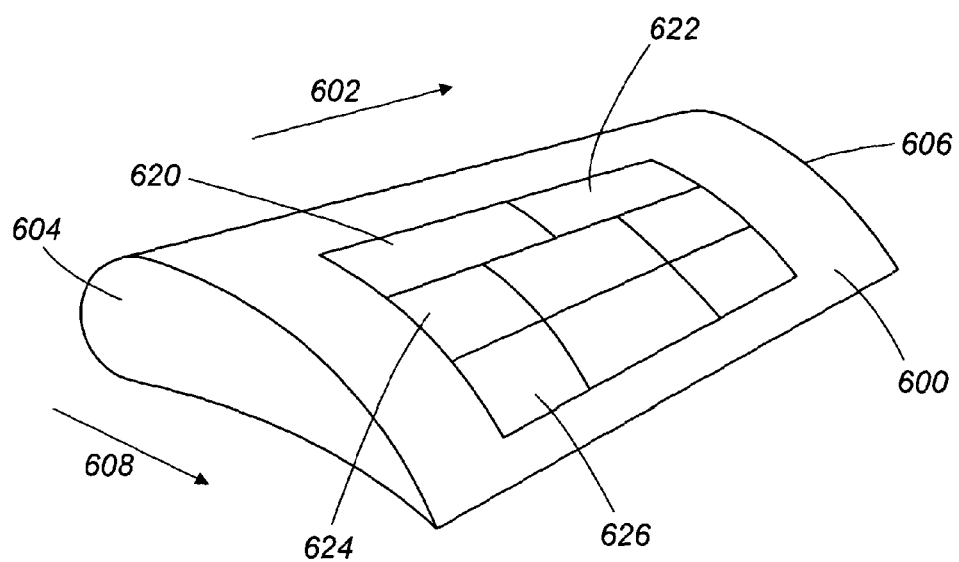
FIG. 6 shows multiple different facets of a blade portion.

FIG. 6 is a perspective view of a section of an elongate turbine blade 600. The blade extends in a lengthwise direction 602, with edge 604 of the illustrated section being closest to the root of the blade and with the profile generally tapering to edge 606 being closer to the blade tip. A transverse direction is illustrated by arrow 608 from the leading edge 610 to the trailing edge 612.

As discussed above, the surface or skin of the blade may be divided into discrete regions as indicated schematically at 620, 622, 624 etc. for example, different regions having different CA geometries making up a controlled impedance layer. The edges of the regions may result from or correspond to a change in underlying construction, eg a change from a solid skin region to an area of sandwich construction. Alternatively the edges may define discrete ranges of values in a continuously varying parameter, eg the thickness of an underlying epoxy layer which varies along or across the blade profile.

Therefore, in the example of FIG. 6, moving in a profile along the transverse direction, the transition from region 620 to 624 is indicative of a change in cross section at the edge of a reinforcing web (eg 104 in FIG. 1). At the transition, the CA geometry of the impedance layer changes from a first pattern to a second pattern to maintain a desired absorption characteristic. Similarly the transition from region 624 to 626 indicates the other edge of the web. Again there is change in CA geometry, which may be back to the first pattern, or to a third pattern, different to the other two.

In the lengthwise direction, transition from region 620 to region 622 does not indicate a step change in construction, but results from a continuous variation in underlying material properties in that direction. The position of the boundary between region 620 and 622 is determined as the result of a user defined optimisation process which aims to balance absorption performance (eg attenuation value and bandwidth) against CA design complexity.

It will be understood that the present invention has been described above purely by way of example, and modification of detail can be made within the scope of the invention.

Each feature disclosed in the description, and (where appropriate) the claims and drawings may be provided independently or in any appropriate combination.

What is claimed is:

1. A wind turbine blade comprising a multilayer composite structure including
    a first reflective layer; and
    a second layer spaced apart from said first layer, said second layer comprising a plurality of resistive circuit analogue elements, wherein
    said CA circuit analogue elements are tuned so as to interact with said first layer to provide absorption of electromagnetic energy over a desired frequency range,
    said turbine blade includes a plurality of different regions, the spacing between the first layer and the second layer being different in said different regions, and
    said circuit analogue elements have different geometries in said different regions.

2. The wind turbine blade according to claim 1, wherein the plurality of different regions comprise at least five different regions along a lengthwise blade profile.

3. The wind turbine blade according to claim 1, wherein the plurality of different regions comprise at least three different regions along a transverse blade profile.

4. The wind turbine blade according to claim 1, wherein the plurality of different regions comprise at least 20 different regions.

5. The wind turbine blade according to claim 1, wherein said second layer comprises a cloth, and wherein said circuit analogue elements are deposited onto said cloth by screen printing with resistive ink.

6. The wind turbine blade according to claim 1, wherein the circuit analogue elements have a surface resistance of approximately 20 $\Omega$/sq.

7. The wind turbine blade according to claim 1, wherein said circuit analogue elements comprise square loops.

8. The wind turbine blade according to claim 1, wherein said circuit analogue elements comprise square patches.

9. The wind turbine blade according to claim 1, wherein said circuit analogue elements occupy less than 70% of a surface area of said second layer.

10. A wind turbine blade according to claim 1, wherein said desired frequency range is from 2.7 to 3.2 GHz.

11. A method of manufacturing a wind turbine blade comprising:
    screen printing a glass cloth with a plurality of resistive circuit analogue elements;
    providing an electromagnetically reflective layer; and
    including said printed cloth and reflective layer in an assembly of a composite layered structure of a wind turbine blade, such that said cloth and said resistive layer are spaced apart by a defined separation.

12. The method according to claim 11, comprising printing a plurality of glass cloths, each of the plurality of glass cloths having circuit analogue elements of different geometries, and including cloths having different geometries in different sections of the wind turbine blade, the defined separation varying between the different sections.

* * * * *